United States Patent
Gardner, Jr. et al.

(10) Patent No.: US 6,631,102 B2
(45) Date of Patent: Oct. 7, 2003

(54) IMAGING DEVICE AND METHOD FOR USE IN AN AUTOCHANGER

(75) Inventors: Richard L. Gardner, Jr., Greeley, CO (US); Kelly J. Reasoner, Fort Collins, CO (US); Marie B. Struckman, Westminster, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/532,930

(22) Filed: Mar. 22, 2000

(65) Prior Publication Data

US 2002/0145949 A1 Oct. 10, 2002

(51) Int. Cl.⁷ .................................... G11B 15/18
(52) U.S. Cl. .................. 369/36.01; 369/30.45; 360/92
(58) Field of Search .................. 369/36.01, 34.01, 369/38.01, 39.01, 178, 179, 192, 30.41, 30.43, 30.44, 30.45, 178.01; 360/92, 98.04, 98.06; 414/278, 279

(56) References Cited

U.S. PATENT DOCUMENTS

| | | | |
|---|---|---|---|
| 5,041,789 A | * 8/1991 | Keller et al. | 324/318 |
| 5,237,467 A | * 8/1993 | Marlowe | 360/92 |
| 5,323,327 A | * 6/1994 | Carmichael et al. | 235/383 |
| 5,373,489 A | * 12/1994 | Sato et al. | 369/30.63 |
| 5,427,489 A | * 6/1995 | Chalmers et al. | 360/92 |
| 5,442,163 A | * 8/1995 | Nakahara et al. | 235/375 |
| 5,544,146 A | 8/1996 | Luffel et al. | 369/178 |
| 5,608,714 A | * 3/1997 | Shiba et al. | 369/30.84 |
| 5,644,559 A | 7/1997 | Christie, Jr. et al. | 369/36 |
| 5,682,096 A | 10/1997 | Christie, Jr. et al. | 324/207.2 |
| 5,761,161 A | * 6/1998 | Gallo et al. | 369/36 |
| 5,886,853 A | * 3/1999 | Yoshida et al. | 360/69 |
| 5,999,356 A | * 12/1999 | Dimitri et al. | 360/71 |
| 6,005,745 A | * 12/1999 | Filkins et al. | 360/92 |
| 6,064,543 A | * 5/2000 | Tatsuda | 360/92 |
| 6,120,230 A | * 9/2000 | Brown | 414/273 |
| 6,144,520 A | * 11/2000 | Yamakawa et al. | 360/92 |
| 6,153,999 A | * 11/2000 | Borrego | 318/568.11 |
| 6,203,262 B1 | * 3/2001 | Frich et al. | 414/331.01 |
| 6,205,093 B1 | * 3/2001 | Abbott et al. | 369/34 |
| 6,246,642 B1 | * 6/2001 | Gardner, Jr. et al. | 369/36 |

FOREIGN PATENT DOCUMENTS

| | | | |
|---|---|---|---|
| GB | 2109598 A | 2/1983 | H03J/9/00 |
| JP | 05144147 A | 11/1993 | G11B/15/68 |
| JP | 05144156 A | 11/1993 | G11B/17/22 |
| JP | 07098920 A | 11/1995 | G11B/17/22 |

OTHER PUBLICATIONS

Data sheets of Welch Allyn, "SCANTEAM 6500/6610 Series, Fixed Mount Stationary Beam Bar Code Scanners", dated listed—Apr. 17, 1997, 2 pages.

Data sheets of Welch Allyn, "SCANTEAM 6500/6600 Series, Fixed Mount Stationary Beam Bar Code Scanners", dated listed—Jan. 1995, 2 pages.

* cited by examiner

Primary Examiner—Hoa T. Nguyen
Assistant Examiner—Dzung C. Nguyen

(57) ABSTRACT

An autochanger includes an imaging device affixed to a media handling device. The autochanger is of the type that uses optical indicia to identify media pieces located therein. The imaging device is movable between a first position and a second position relative to the media handling device. The autochanger moves the imaging device to positions relative to the media pieces where the imaging device can read the indicia. The autochanger further moves the imaging device relative to the media handling device to optimize the reading capability of the imaging device without increasing the size of the autochanger.

15 Claims, 9 Drawing Sheets

IMAGING DEVICE AND METHOD FOR USE IN AN AUTOCHANGER

FIELD OF THE INVENTION

The following invention generally relates to an imaging device used in an autochanger and, more particularly, to a bar code reader movably attached to a media handling device used in an autochanger.

BACKGROUND OF THE INVENTION

An autochanger is a device that is used for storing large amounts of data on a plurality of media pieces, such as magnetic or optical media. An autochanger typically comprises a media library, a media handler, a media player, and a processor. The media library typically has a plurality of bays that store individual media pieces. The media player translates the data stored on the media pieces to a usable format, e.g., a binary format. The media player also writes data onto the media pieces. The media handler, which may also be referred to herein as a "picker," transports the media pieces between the bays in the media library and the media player. The processor controls the movement of the media handler and indexes the locations of the media pieces within the autochanger.

One of the uses of the autochanger is for backing up large amounts of data. For example a bank or other industry may have account information and the like stored as data in a storage system. The storage system provides for quick access to the account information during business hours. The bank or other industry may back up the data on a periodic basis, e.g., nightly, in case the data stored in the storage system becomes corrupt. In the event the data stored in the storage system becomes corrupt, it can readily be replaced by transferring data from the media pieces stored in the autochanger to the storage system. In addition, if only a portion of the data in the storage system becomes corrupt, that portion may be replaced by its copy stored in the autochanger. Accordingly, it is necessary for the autochanger to catalog where particular portions of data are stored within the autochanger. For example, the autochanger may index portions of data to the locations on particular media pieces where the data is located.

Some autochangers use media pieces that have optical indicia located thereon that serve to identify the individual media pieces. The optical indicia may, as an example, be conventional bar codes that correspond to alphanumeric characters, which identify each individual media piece. An optical reader may be attached to the media handling device and may serve to read the optical indicum. For example, the optical reader may be a bar code reader. The autochanger uses the optical reader to "read" the optical indicia and, thus, to identify the individual media pieces located within the autochanger.

Some autochangers have a scanning beam bar code reader attached to the media handler, which allows the autochanger to read the bar codes attached to the media pieces. Scanning beam bar code readers, however, are typically expensive and comprise several moving parts, which makes them susceptible to failure. The increased susceptibility to failure is due to the scanning bar code readers being attached to the media handler, which moves throughout the autochanger. This movement typically causes relatively harsh acceleration forces to be applied to the bar code readers. Thus, the addition of scanning bar code readers to the autochanger increases the cost of the autochanger and reduces its reliability.

The media library typically comprises several adjacent columns of media pieces. The media handler moves in a vertical direction to access media pieces stored in a particular column. The media handler also moves in a horizontal direction to access media pieces stored in different columns. An objective in the design of autochangers is to limit the size of the autochangers, thus, the media pieces in the library are typically compacted within a small space. In addition, the movement of the media handler should be limited so as not to require additional space in the autochanger for movement.

Therefore, a need exists for a bar code reader that may be affixed to a media handling device used by an autochanger wherein the bar code reader is minimally susceptible to failure due to the movements of the media handling device.

SUMMARY OF THE INVENTION

An autochanger having an imaging device attached to a media handling device is disclosed herein. The autochanger may comprise a library and a media handling device that is movable relative to the library. The media handling device may comprise a support mechanism having a first portion and a second portion wherein the first portion is attached to the media handling device and wherein the second portion is movably associated with the first portion. An imaging device may be attached to the support mechanism second portion. The support mechanism second portion may have a first operative position and a second operative position relative to the support mechanism first portion.

The library may be adapted to hold a plurality of media pieces having optical indicia affixed thereto. The autochanger may move the media handling device to positions where the imaging device may read the optical indicia. In order to provide a minimally sized autochanger, the imaging device may move between the first operative position and the second operative position to read selected indicia. This movement allows the media handling device to move the imaging device to positions where it is able to read the indicia without the need to move beyond the confines of the autochanger.

The attachment of the imaging device to the media handling device allows for relative movement between the imaging device and the media pieces. This relative movement may be used by the imaging device to read the indicia affixed to the media pieces by causing the imaging device to "scan" the indicia. In the situation where the indicia are bar codes, the relative movement may be used by the imaging device to scan the bar codes. Accordingly, the imaging device may be a fixed beam bar code reader rather than a scanning beam bar code reader, which reduces the cost and improves the reliability of the autochanger.

DETAILED DESCRIPTION OF THE INVENTION

Figure 1:
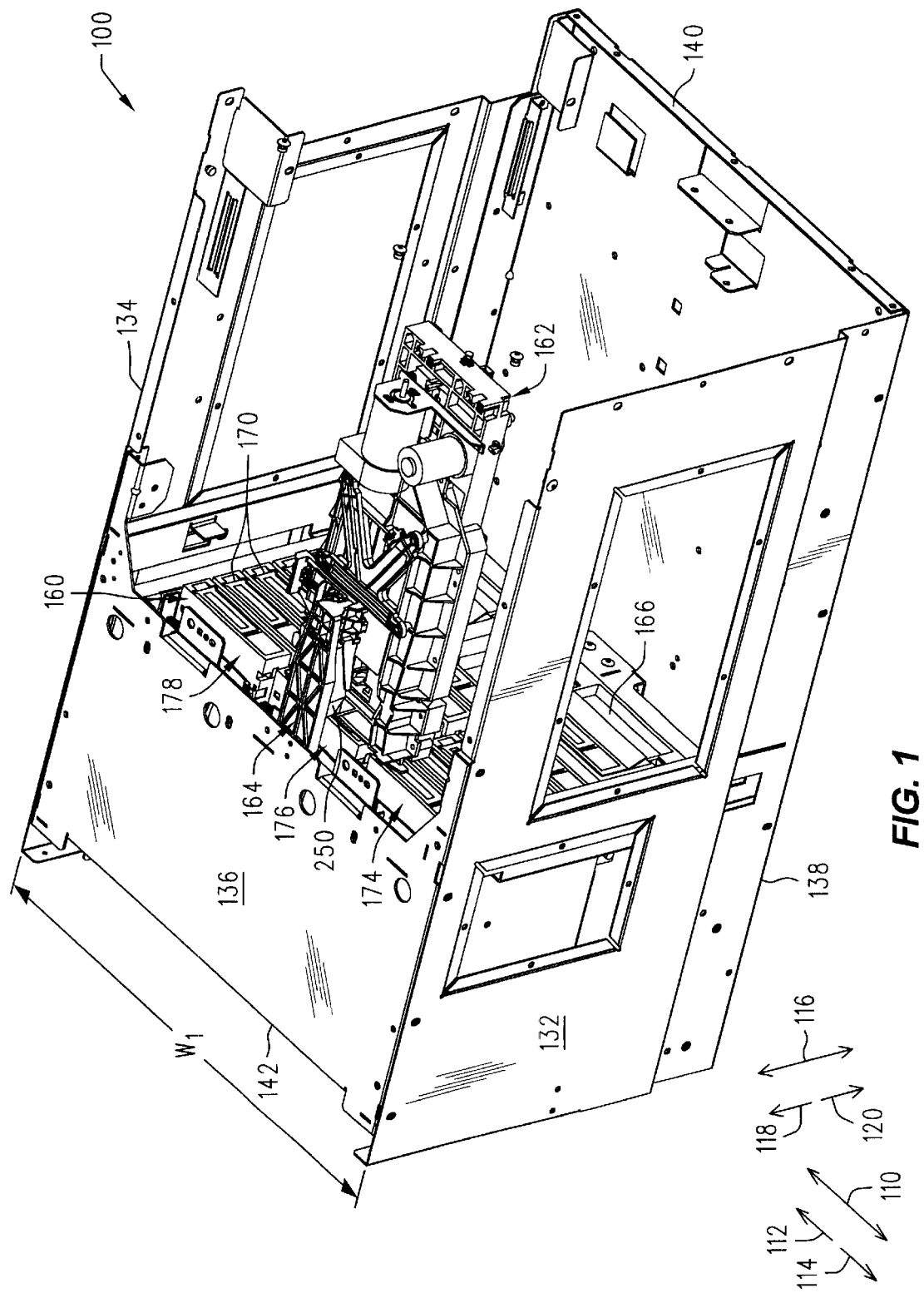
FIG. 1 is a top, rear, cut away perspective view of an autochanger.

FIGS. 1 through 10, in general, illustrate a media handling device 100 comprising a support mechanism 260 having a first portion 262 and a second portion 264. The first portion 262 is attached to the media handling device 162 and wherein the second portion 264 is movably associated with the first portion 262. An imaging device 250 is attached to the support mechanism second portion 264. The support mechanism second portion 264 has a first operative position and a second operative position relative to the support mechanism first portion 262.

FIGS. 1 through 10 also, in general, illustrate an autochanger 100. The autochanger 100 comprises a media library 160 having a plurality of media holding bays and a media handling device 162 movably associated with the media holding bays. The media handling device 162 comprises a support mechanism 260 having a first portion 262 and a second portion 264 wherein the first portion 262 is attached to the media handling device 162 and wherein the second portion 264 is movably associated with the first portion 262. The support mechanism second portion 264 has a first operative position and a second operative position relative to the support mechanism first portion 262. An imaging device 250 is attached to the support mechanism second portion 264.

FIGS. 1 through 10 also, in general, illustrate a method for reading optical indicia 196 attached to media pieces 170. The method comprises: providing a first media piece 180 located at a first position, the first media piece 180 having a first optical indicum 196 attached thereto; providing a second media piece 200 located at a second position, the second media piece 200 having a second optical indicum 196 attached thereto; providing a media handling device 162. The media handling device 162 comprising a support mechanism 260 having a first portion 262 and a second portion 264. The first portion 262 is attached to the media handling device 162 and the second portion 264 is movably associated with the first portion 262. The support mechanism second portion 264 has a first operative position and a second operative position relative to the support mechanism first portion 262. The method for reading optical indicia 196 further comprises: providing an imaging device 250 attached to the support mechanism second portion 264; moving the support mechanism second portion 264 to the first operative position; reading the first optical indicum 196 using the imaging device 250; moving the support mechanism second portion 264 to the second operative position; and reading the second optical indicum 196 using the imaging device 250.

FIGS. 1 through 10 also, in general, illustrate a method for reading an optical indicum 196 attached to a media piece 180. The method comprises: providing a media handling device 162, the media handling device 162 being movable relative to the optical indicum 162; providing a fixed beam imaging device 250 attached to the media handling device 162; causing relative movement between the imaging device 162 and the optical indicum 196; generating image data representative of the optical indicum 196 while the imaging device 162 is moved relative to the optical indicum 196.

Having generally described the apparatus and method, they will now be described in greater detail. Except for the addition of an imaging device 250 and an engagement member 164 described herein, autochanger 100, including the components thereof, may, for example, be of the type commercially available from the Hewlett-Packard Company and sold as Model Number HP 4228w or of the type described in the following U.S. Pat. No. 5,644,559 of Christie, et al., for FLIP LATCH ASSEMBLY FOR MEDIA AUTOCHANGER; and U.S. Pat. No. 5,682,096 of Christie, et al., for METHOD AND APPARATUS FOR MONITORING OPERATING POSITIONS OF A MEDIA AUTOCHANGER, both of which are hereby incorporated by reference for all that is disclosed therein.

A cut away top perspective view of the autochanger 100 is illustrated in FIG. 1. It should be noted that for illustration purposes, the view of FIG. 1 is a rear view of the autochanger 100. For reference purposes, the autochanger 100 and its components are described herein with reference to a horizontal direction 110 and a vertical direction 116. The horizontal direction 110 is sometimes referred to as a translational direction. The horizontal direction 110 may be described in greater detail with reference to a positive horizontal direction 112 and a negative horizontal direction 114. The vertical direction 116 may be described in greater detail with reference to a positive vertical direction 118 and a negative vertical direction 120.

The components comprising the autochanger 100 may be located in a chassis 130. It should be noted that, for illustration purposes, not all the components comprising the autochanger 100 are illustrated as being located in the chassis 130 of FIG. 1. The chassis 130 may contain a library 160, a picker 162, an engagement member 164, and a media player 166. Servos and other drive mechanisms that move the picker 162 within the chassis 130 are not illustrated in FIG. 1. The chassis 130 may be a parallel-piped structure having a right portion 132, a left portion 134, top portion 136, a bottom portion 138, a rear portion 140, and a front portion 142. The right portion 132 and the left portion 134 may be separated by a width W1. One of the objectives in the design of the autochanger 100 is to minimize the size of the chassis 130, which is achieved, in part, by minimizing the width W1.

The library 160 may contain a plurality of media pieces 170, wherein each media piece 170 is stored in an individual bay. The library 160 may have the media pieces 170 arranged in columns. The autochanger 100 illustrated in FIG. 1 has three columns in the library 160, a first column 174, a second column 176, and a third column 178, that extend in the vertical direction 116. It is to be understood that the use of three vertically extending columns of media pieces 170 is for illustration purposes only and that the autochanger 100 may have more or fewer columns and that the columns may extend in other directions. The media player 166 may be located in the proximity of the library 160 and may serve to read data from and write data to the media pieces 170 in a conventional manner. It should be noted that only one media player 166 is illustrated as being located in the chassis 130, however, it is to be understood that several media players 166 may be located in the chassis 130.

Figure 2:
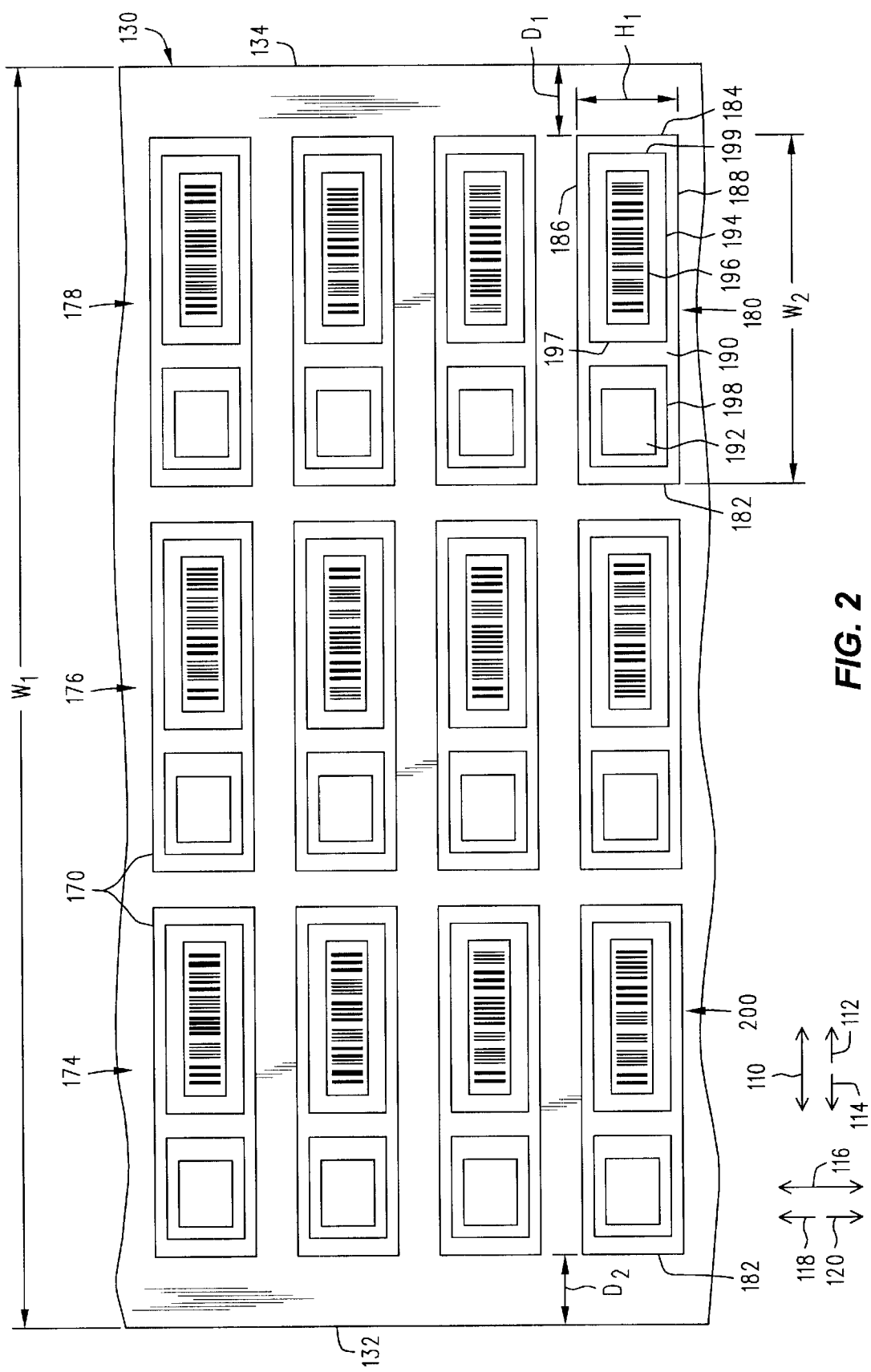
FIG. 2 is a front view of a library located in the autochanger of FIG. 1.

A partial front view of the library 160 with media pieces 170 located therein is illustrated in FIG. 2. The media pieces 170 are illustrated herein as being digital linear tape cartridges, however, it is to be understood that other forms of media may be used in place of the digital linear tape cartridges. Two media pieces, a first media piece 180 and a second media piece 200, will be used as references to describe all the media pieces 170 and the relations of the media pieces 170 to the chassis 130. The first media piece 180 may have a left side 182, a right side 184, a top side 186, a bottom side 188, and a front side 190. The left side 182 may be separated from the right side 184 by a width W2 and the top side 186 may be separated from the bottom side 188 by a height H1. The front side 190 may have a read/write portion 198 with a read/write switch 192 located therein. The read/write switch 192 may serve to prevent data from being erased from the media piece in a conventional manner. The front side 190 may also have an indicum portion 194 with an indicum 196 located therein. The indicum 196 may have a left portion 197 and a right portion 199. The indicum 196 may, as an example, be a conventional bar code that contains information, which identifies the first media piece 180. As illustrated in FIG. 2, the indicum portion 194 is located in the proximity of the right side 184 of the first media piece 180.

As described above, the indicum 196 may, as an example, be a conventional bar code. The bar code may have a series of bars and spaces that extend in the vertical direction 116. The indicum 196 may represent an identification, such as an alphanumeric sequence, that distinguishes the individual media pieces from each other. The indicum 196 may be "read" from the left portion 197 to the right portion 199 by a conventional bar code reader in a conventional manner.

The right side 184 of the first media piece 180 may be separated from the left portion 134 of the chassis 130 by a distance D1. The left side 182 of the second media piece 200 may be separated from the right portion 132 of the chassis 130 by a distance D2. Accordingly, the width W1 of the chassis 130 is dependant on the distance D1 and the distance D2. One method of meeting the design objective of having a small chassis 130 is by minimizing the distance D1 and the distance D2.

Referring again to FIG. 1, the picker 162 may be located adjacent the library 160 and may move throughout the chassis 130 in the horizontal direction 110 and the vertical direction 116. As will be described in greater detail below, the picker 162 may serve to transport the media pieces 170 between the media player 166 and the library 160. The autochanger 100 may have servos and orientation systems that move the picker 162 within the autochanger 100 and determine the position of the picker 162 within the autochanger 100. Examples of servo and orientation systems used in an autochanger are described in U.S. Pat. No. 5,544,146 for CARTRIDGE HANDLING SYSTEM of Luffel et al., which is hereby incorporated by reference for all that is disclosed therein.

The chassis 130 may have a plurality of hard stops, not shown, that limit the movement of the picker 162 within the chassis 130. When the picker 162 encounters a hard stop, the current supplied to the servos moving the picker 162 against the hard stop will increase. Thus, by measuring the current supplied to the servos, the autochanger 100 is able to determine if the picker 162 has encountered a hard stop or other encumbrance within the autochanger 100.

Figure 3:
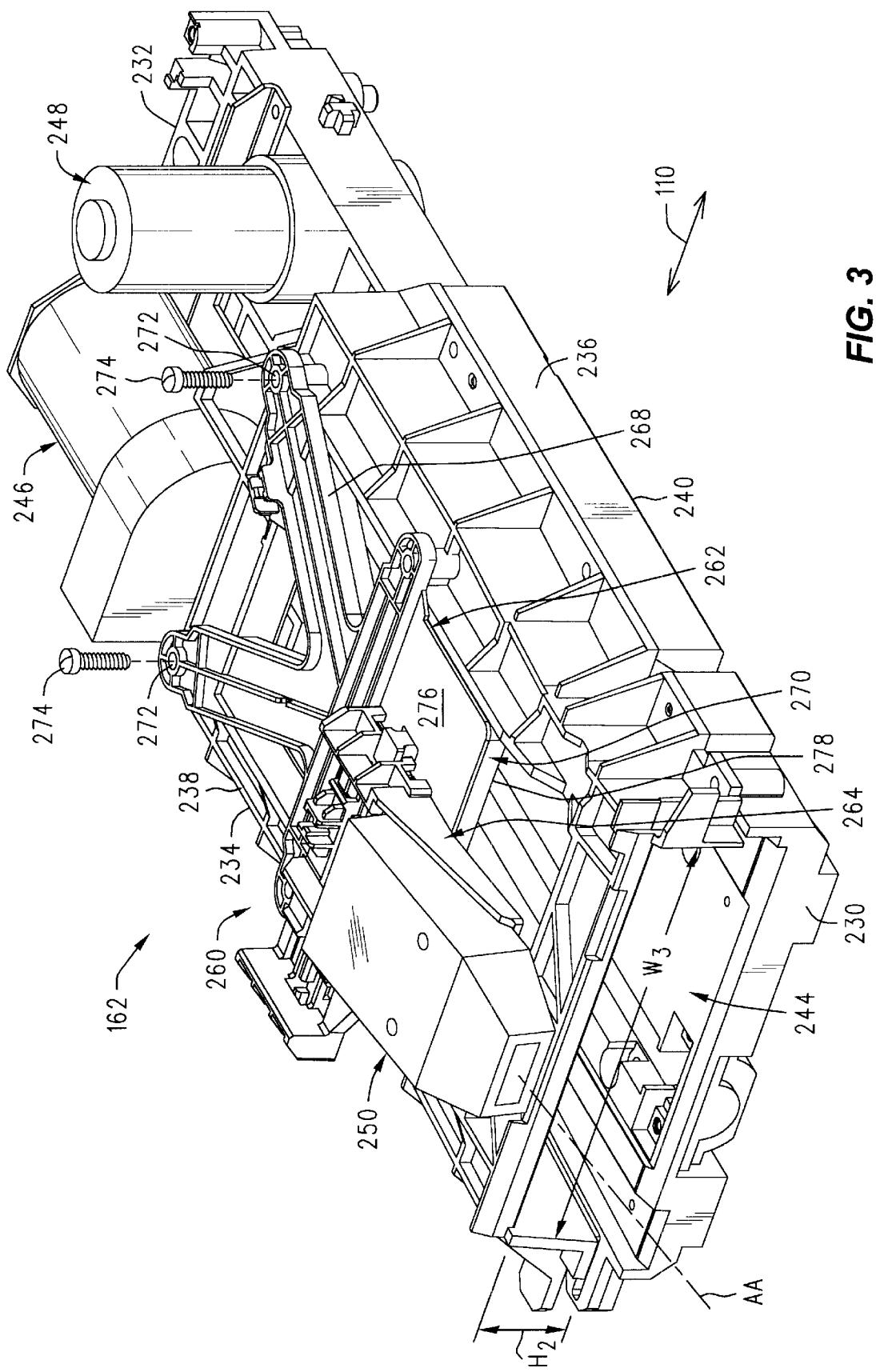
FIG. 3 is a top front perspective view of a picker illustrated in the autochanger of FIG. 1.

FIG. 3 provides an enlarged view of the picker 162. It should be noted that the view of the picker 162 illustrated FIG. 3 is reversed from the view of the picker 162 illustrated in FIG. 1. The picker 162 may have a front portion 230, a rear portion 232, a left portion 234, a right portion 236, a top portion 238, and a bottom portion 240. The front portion 230 may have an opening 244 formed therein. The opening 244 may have a height H2 and a width W3, which may be appropriately sized to allow a media piece 170, FIG. 2, to pass into the picker 162.

Figure 4:
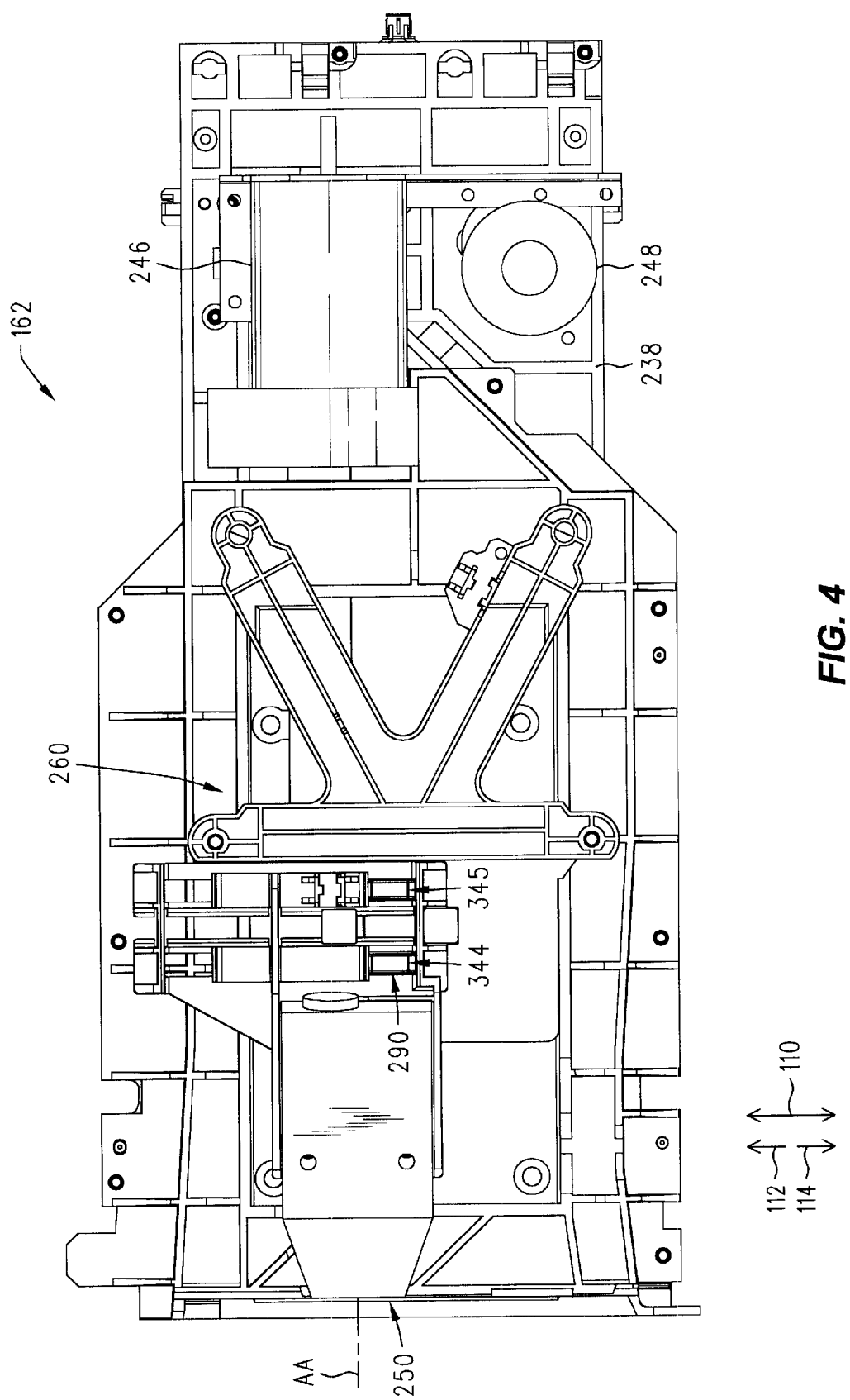
FIG. 4 is a top view of the picker illustrated in FIG. 3 having an imaging device located in a first position relative to the picker.

Referring to FIG. 4, which is a top view of the picker 162, the top portion 238 of the picker 162 may have a first servo 246 and a second servo 248 attached thereto. The first servo 246 may serve to transport digital linear tapes through the opening 244, FIG. 3, in a conventional manner. For example, the first servo 246 may serve to extract media pieces 170, FIG. 2, from and insert media pieces 170, FIG. 2, into the library 160. The second servo 248 may serve to move the picker 162 in the horizontal direction 110 in a conventional manner. A current monitor, not shown, may be associated with the second servo 248 and may serve to indicate when the picker 162 encounters a hard stop or other encumbrance within the autochanger 100, FIG. 1.

Figure 5:
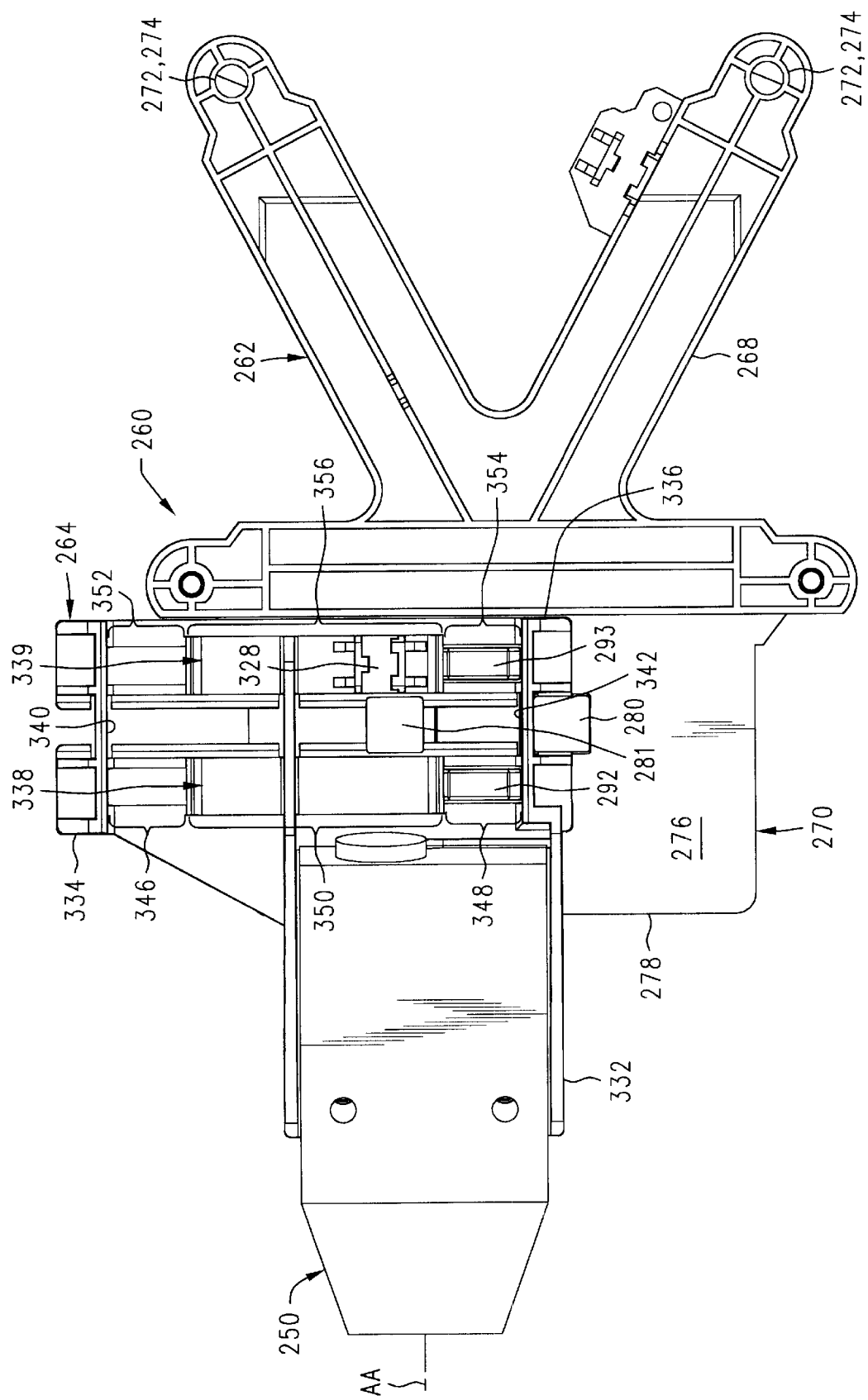
FIG. 5 is a top view of a support mechanism illustrated in the picker of FIG. 3 having an imaging device attached thereto.

Referring to FIGS. 4 and 5, the top portion 238 of the picker 162 may have a support mechanism 260 attached thereto. FIG. 5 illustrates an enlarged view of the support mechanism 260. As will be described in greater detail below, the support mechanism 260 may serve to slidably attach an imaging device 250 to the picker 162. The support mechanism 260 may have a first portion 262 slidably associated with a second portion 264. The first portion 262 may have a bracket 268 with a platform 270 attached thereto. The bracket 268 may have a plurality of holes 272 with screws 274 passing therethrough. The holes 272 in conjunction with the screws 274 serve to secure the support mechanism 260 to the picker 162.

Figure 6:
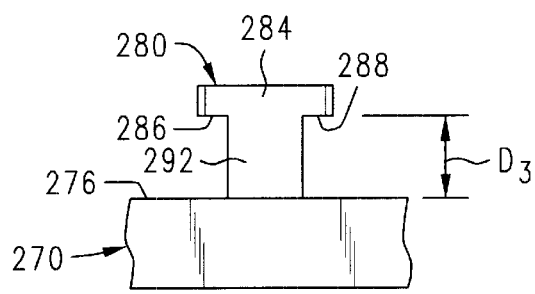
FIG. 6 is a side view of a retainer illustrated in the picker of FIG. 3.

The platform 270 may have an upper side 276 and a lower side 278. A first retainer 280 and a second retainer 281 may be attached to or integrally formed with the upper side 276. The first retainer 280 and the second retainer 281 may be substantially similar to each other. Referring briefly to FIG. 6, which is a side view of the first retainer 280, the first retainer 280 may be a T-shaped device having a stem 282 attached to a cross member 284. The cross member 284 may have a first guide portion 286 and a second guide portion 288 facing the platform 270. The first guide portion 286 and the second guide portion 288 may be located a distance D3 from the upper side 276 of the platform 270. Referring again to FIGS. 4 and 5, as will be described in greater detail below, the first retainer 280 and the second retainer 281 may serve to guide the second portion 264 in the horizontal direction 110 relative to the first portion 262. The first retainer 280 and the second retainer 281 may also serve to retain the second portion 264 in close proximity to the first portion 262.

Figure 7:
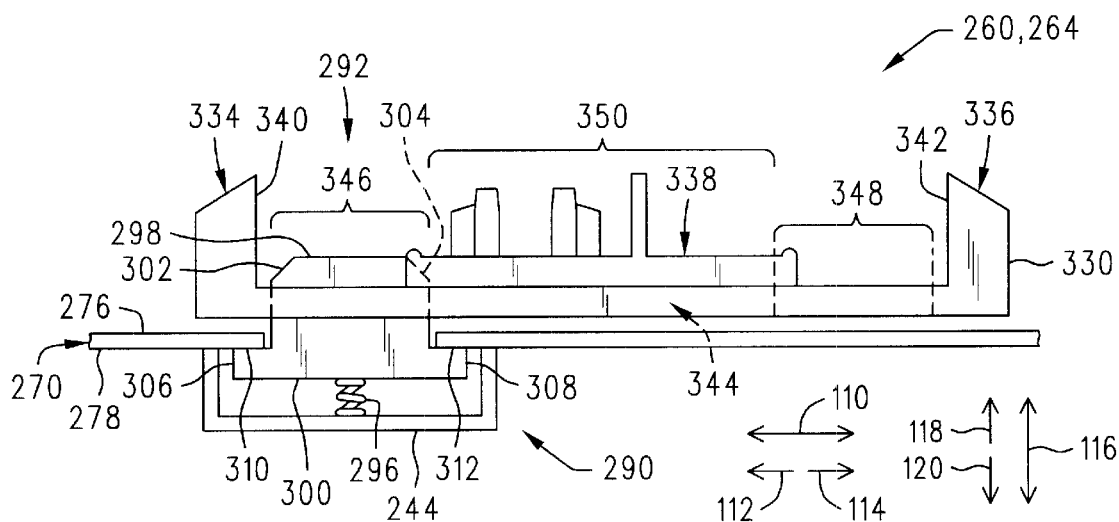
FIG. 7 is a side, cut away view of a slide mechanism illustrated in the picker of FIG. 3.

The platform 270 may have a lock mechanism 290 associated therewith. Referring to FIG. 7, which is a front cut away view of the platform 270, the lock mechanism 290 may pass through the platform 270. As will be described in greater detail below, the lock mechanism 290 may serve to lock the second portion 264 of the support mechanism 260 relative to the platform 270. The lock mechanism 290 may have a first lock 292 and a second lock 293, FIG. 5, located in a housing 294. Only the first lock 292 is illustrated in the side view of FIG. 7, however, both locks 292, 293, FIG. 5, are described with reference to the first lock 292 illustrated in FIG. 7. The first lock 292 may have a top portion 298, a bottom portion 300, a first slope 302, a second slope 304, a first extension 306, a second extension 308, a first contact surface 310, and a second contact surface 312. The first slope 302 and the second slope 304 may be substantially planar surfaces that are formed at an angle relative to the top portion 298. The first contact surface 310 and the second contact surface 312 may be portions of the first extension 306 and the second extension 308 that are adapted to contact the lower side 278 of the platform 270. The housing 294 may serve to contain the first lock 292 in the proximity of the platform 270. A spring 296 or other detent mechanism may be connected between the first lock 292 and the housing 294.

The spring 296 may serve to bias the first lock 292 in the positive vertical direction 118. When the first lock 292 is extended in the positive vertical direction 118 it is sometimes referred to as being in the "locked" state. Moving the first lock 292 in the negative vertical direction 120 may be accomplished by applying a force in negative vertical direction 120 to the top portion 298 of the first lock 292. Moving the first lock 292 in the negative vertical direction 120 may also be accomplished by applying a force in the positive horizontal direction 112 to the second slope 304 or applying a force the negative horizontal direction 114 to the first slope 302. When the first lock 292 is moved in the negative vertical direction 120 it is sometimes referred to as being in the "unlocked" state. It should be noted that the first lock 292 and the second lock 293, FIG. 5, both may be located in the same housing 294 and connected to the same spring 296. Referring again to FIGS. 4 and 5, the first lock 292 and the second lock 293 may extend through the platform 270 to engage the second portion 264 of the support mechanism 260.

The second portion 264 of the support mechanism 260 may be operatively or slidably associated with the platform 270 and, thus, the first portion 262. The second portion 264 may have a slide 330 with a bracket 332 attached thereto. The bracket 332 may serve to support the imaging device 250. The slide 330 may have a first end portion 334 and a second end portion 336 with a first mid portion 338 and a second mid portion 339 located therebetween. Referring again to FIG. 7, which illustrates a side cut away view of the slide 330, including the first mid portion 338, the slide 330 may have a first stop 340 associated with the first end portion 334 and a second stop 342 associated with the second end portion 336. The first mid portion 338 may have a first open portion 346, a second open portion 348, and a closed portion 350. The first open portion 346 and the second open portion 348 may be appropriately sized so that the first lock 292 may pass through them. A first channel 344 may extend between the first stop 340 and the second stop 342 and may extend below the closed portion 350. The first channel 344 may be appropriately sized so as to accommodate the first lock 292, which allows the slide 330 to move in the horizontal direction 110 as is described in greater detail below.

Referring again to FIGS. 4 and 5, the second mid portion 339 may be substantially similar to the first mid portion 338. The second mid portion 339 may have a first open portion 352, a second open portion 354, and a closed portion 356 that are substantially similar to their corresponding parts of the first mid portion 338. A second channel, not shown, that is substantially similar to the first channel 344, FIG. 7, may extend between the first stop 340 and the second stop 342 and under the closed portion 356. The second channel may be appropriately sized to accommodate the second lock 293 as the second portion 264 moves relative to the first portion 262. The closed portions 350, 354 may serve to cover the first channel 344 and the second channel so as to recess the locks 292, 293 into the housing 294 as the slide 330 moves in the horizontal direction 110.

Referring to FIGS. 5 and 6, the use of two mid portions 338, 339 in conjunction with the first and second retainers 280, 281 provides for a substantially linear movement of the second portion 264 relative to the first portion 262 in the horizontal direction 110. With reference to the first retainer 280, the first guide portion 286 and the second guide portion 288 may contact the first mid portion 338 and the second mid portion 339 respectively. This contact retains the slide 330 in close proximity to the upper side 276 of the platform 270. In addition, this contact provides for a linear movement of the slide 330 relative to the platform 270 in the horizontal direction 110.

The second mid portion 339 may have a cable clasp 328 attached thereto. The cable clasp 328 may serve to secure a data and/or power cable, not shown, associated with the imaging device 250. The cable clasp 328 prevents the data and/or power cable from binding on components located within the autochanger 100, FIG. 1, as the second portion 264 and the picker 162 move relative to each other and throughout the autochanger 100, FIG. 1.

Figure 8:
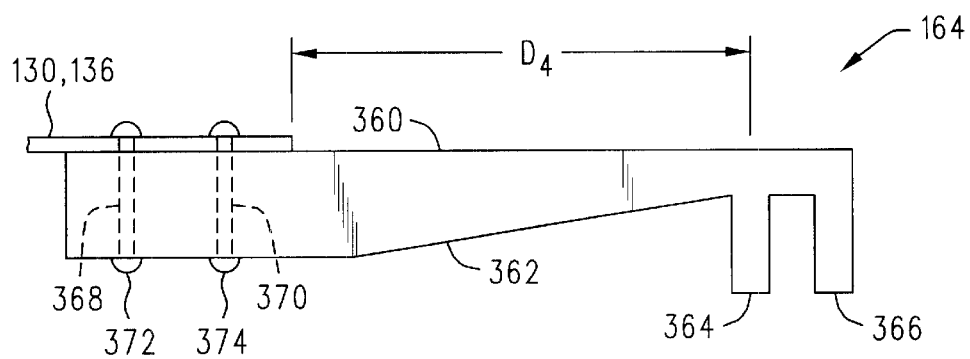
FIG. 8 is a side view of an engagement member illustrated in the autochanger of FIG. 1.

Referring again to FIG. 1, the engagement member 164 may extend from the top portion 136 of the chassis 130. An enlarged side view of the engagement member 164 is illustrated in FIG. 8. The engagement member 164 may be a rigid member having an upper side 360 and a lower side 362. A first prong 364 and a second prong 366 may extend from the lower side 362. The mid section of the first prong 364 may be located a D4 from the top portion 136 of the chassis 130. A first hole 368 and a second hole 370 may extend through the engagement member 164 and the top portion 136 of the chassis 130. A first fastener 372 and a second fastener 374 may extend through the first hole 368 and the second hole 370 respectively. The first fastener 372 and the second fastener 374 may serve to attach the engagement member 164 to the top portion 136 of the chassis 130.

Referring to FIGS. 4, 5 and 8, the first prong 364 and the second prong 366 may be adapted to contact the first mid portion 338 and the second mid portion 339 of the slide 330. More specifically, they may serve to press the first lock 292 and the second lock 293 while pushing against either the first stop 340 or the second stop 342. This may be achieved by having the distance D4 appropriately sized so that the first prong 364 and the second prong 366 are able to contact the first mid portion 338 and the second mid portion 339. Accordingly, the first prong 364 may serve to release the locks 292, 293 in the support mechanism 260 and to move the second portion 264 relative to the first portion 262. The first prong 364 and the second prong 366 may also serve to press against the first stop 340 and the second stop 342 of the slide 330. Thus, the engagement member 164 may ultimately serve to move the imaging device 250 relative to the picker 162 as is described in greater detail below.

Referring again to FIG. 3, the imaging device 250 may be secured to the bracket 332 of the second portion 264 in a conventional manner. The imaging device 250 may, as an example, be a conventional, stationary beam, bar code reader. The imaging device 250 may, as an example, be of the type commercially available from the Welch Allyn Company of Skaneateles Falls, N.Y. and sold under the tradename SCANTEAM® 6500. The imaging device 250 may receive a pencil beam of light, which is illustrated as extending along an axis AA. The imaging device 250 may "read" an indicum 196, FIG. 2, by scanning the axis AA across an indicum 196, which causes the imaging device 250 to generate an image of the indicum 196. The imaging device 250 may output digital data that is representative of the image of the indicum 196, which may be processed by a processor, not shown.

Referring again to FIG. 1, as was briefly described above, the autochanger 100 may have position sensors, not shown, that determine the position of the picker 162 within the autochanger 100. The autochanger 100 may also have sensors that determine if the picker 162 has encountered an obstacle or a hard stop. For example, current sensors may monitor the current supplied to the second servo 248 and other servos, not shown, that move the picker 162 within the autochanger 100. If a servo attempts to move the picker 162 against an obstacle, the current drawn by the servo will increase. By monitoring the current, the autochanger 100 is able to determine if the picker 162 has encountered an obstacle or a hard stop. This technique may be used by the autochanger 100 to determine if the picker 162 has properly engaged the engagement member 164 as will be described in greater detail below.

Having described the components comprising the autochanger 100, the operation of the autochanger 100 will now be described in greater detail. The following description provides a summary of the operation of the autochanger 100, followed by a more detailed description of the operation of the autochanger 100.

In summary, the autochanger 100 serves to store large quantities of data on the media pieces 170. This storage ability is accomplished by reading data from and writing data to the media pieces 170, which is performed by the media player 166. The picker 162 serves to transport the media pieces 170 between the library 160 and the media player 166.

Referring to FIGS. 1 and 2, the autochanger 100 uses the imaging device 250 to read the indicia 196 attached to the media pieces 170. More specifically, the picker 162 moves the imaging device 250 in the horizontal direction 110 in order to provide relative movement between the imaging device 250 and an indicium 196. This movement causes the axis AA, FIG. 3, to scan the indicium 196. Accordingly, an image of the indicum 196 is received by the imaging device 250, which generates an image of the indicium 196. Generating an image of an indicum 196 is sometimes referred to as "reading" the indicum 196. Conventional processing is used to decode the indicium 196 and, thus, identify the media piece 170 to which the indicum 196 is attached.

If the imaging device 250 were not able to move relative to the picker 162, the picker 162 would have to move in the horizontal direction 110 beyond the columns of media pieces 170 in order for the imaging device 250 to scan the indicum 196. This extended movement would cause the distance D1 and/or the distance D2 to be increased, which would increase the width W1 of the autochanger 100. As was described above, one of the design objectives of the autochanger 100 is to reduce the size and, thus, the width W1 of the autochanger 100.

Figure 9:
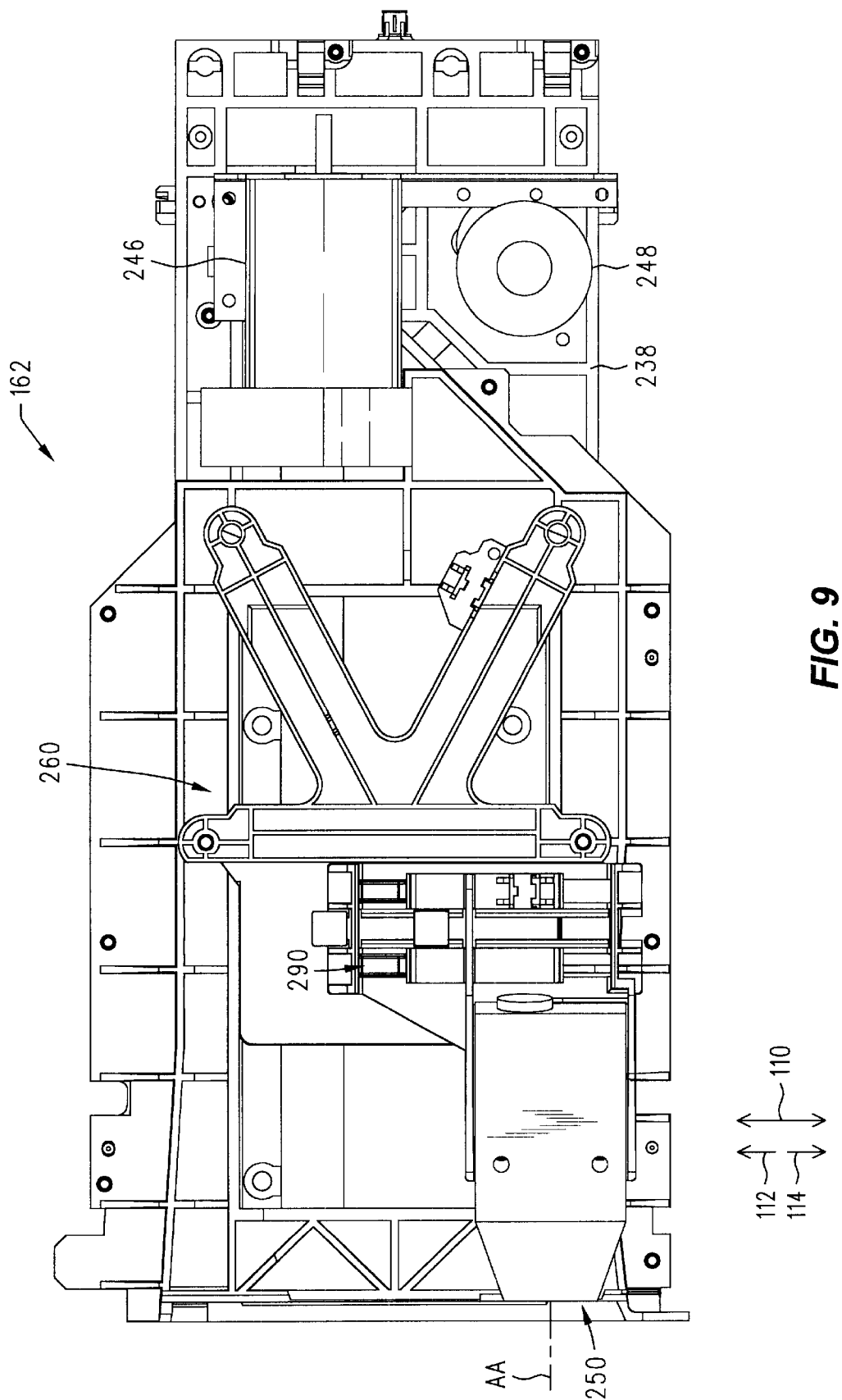
FIG. 9 is view of the picker illustrated in FIG. 3 with the imaging device located in a second position relative to the picker.
Figure 10A:
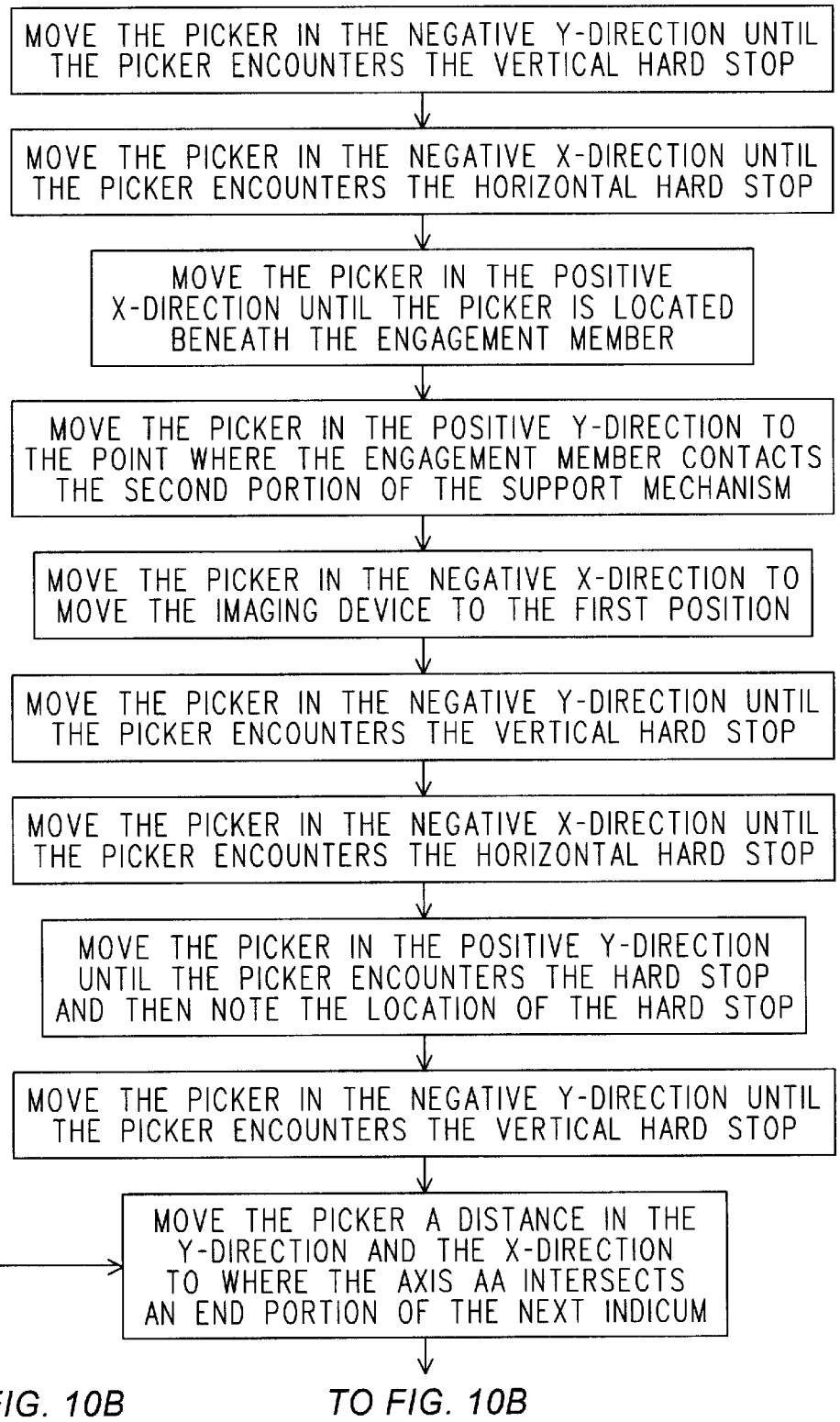
FIGS. 10A and 10B are a flowchart that describes the operation of the autochanger of FIG. 1.
Figure 10B:
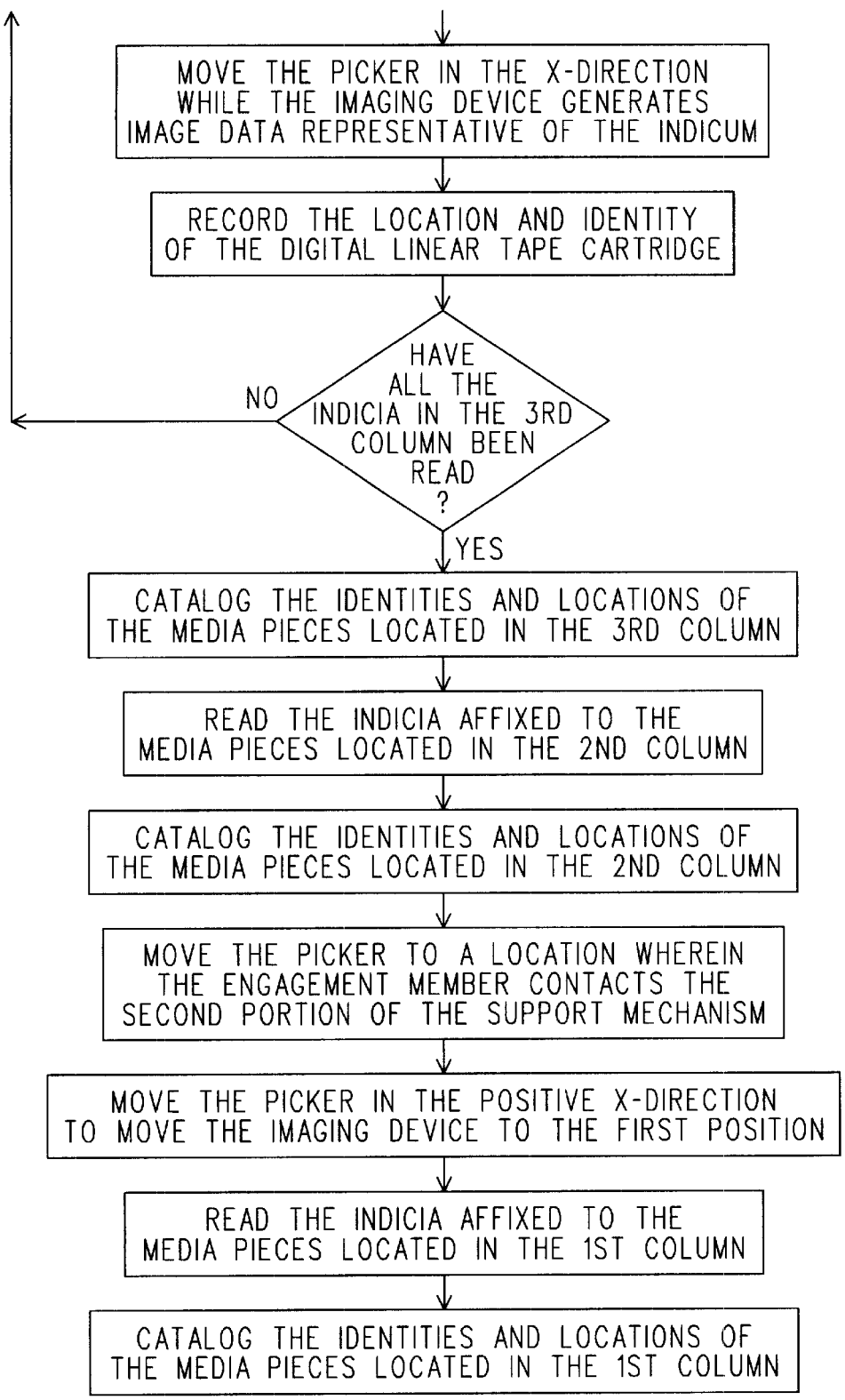

The autochanger 100 described above has minimal distances D1 and D2. The minimal distances D1 and D2 are achieved by moving the imaging device 250 to an optimal position when it reads the indicum 196. More specifically, the imaging device 250 is in a first position as illustrated in FIGS. 1 and 4 when it reads the indicia 196 attached to the media pieces 170 located in the second column 176 and the third column 178. In order to read the indicia 196 attached to the media pieces 170 located in the first column 174, the imaging device 250 moves to a second position, which is illustrated in FIG. 9. Moving the imaging device 250 from the first position to the second position is performed by the autochanger 100 moving the picker 162 to a position where it engages the engagement member 164. Once engaged, the picker 162 moves in the horizontal direction 110, which causes the second portion 264 of the support mechanism 260 to move relative to the picker 162. Accordingly, the imaging device 250 moves between the first position and the second position relative to the picker 162.

Having summarily described the operation of the autochanger 100, it will now be described in greater detail. The following operational description is based on examples of reading indicia 196 affixed to media pieces 170 located in the second column 176 and the third column 178. The operational description follows with a description of reading indicia 196 affixed to media pieces 170 located in the first column 174. The operation of the autochanger 100 is further illustrated by the flow chart of FIGS. 10A and 10B. The operation of the autochanger 100 will be described herein as starting from a "power up" mode. Upon powering up, the autochanger 100 will inventory the media pieces 170 located within the library 160.

Referring to FIGS. 1, 2, and 4, upon powering up the autochanger 100, the autochanger 100 does not know where the picker 162 is located within the autochanger 100, nor does the autochanger 100 know which position the imaging device 250 is in. The autochanger 100 inventory process commences with autochanger 100 determining the position of the picker 162 within the autochanger 100. The autochanger 100 moves the picker 162 in the negative vertical direction 120 until it can no longer move, meaning that the picker 162 has encountered a hard stop. This position is known as the negative vertical hard stop and may be sensed by a rise in the current being supplied to the servos, which is indicative of the picker 162 encountering a hard stop. The location of the negative vertical hard stop may be stored by the autochanger 100 for future processing.

The autochanger 100 may then move the picker 162 in the positive horizontal direction 112 until the picker 162 encounters a hard stop. This location is referred to as the positive horizontal hard stop and may be stored by the autochanger 100 for future reference. The autochanger 100 has information stored therein pertaining to the distance from the positive horizontal hard stop to a point in the horizontal direction 110 where the second portion 264 of the support mechanism 260 aligns with the engagement member 164. Accordingly, the autochanger 100 moves the picker 162 in the negative horizontal direction 114 to this point.

The autochanger 100 has information stored therein pertaining to the distance from the negative vertical stop to the engagement member 164. The autochanger 100 uses this information to move the picker 162 in the positive horizontal direction 112 to a point where the engagement member 164 may engage the second portion 264 of the support mechanism 260. The autochanger 100 then moves the picker 162 in the negative horizontal direction 114, which causes the second portion 264 of the support mechanism 260 to moves to the first position. More specifically, referring to FIGS. 1, 4 and 6, the first prong 364 of the engagement member 164 contacts the first lock 292 and the second prong 366 contacts the second lock 293. As the picker 162 continues to move in the positive vertical direction 118, the engagement member 164 causes the first lock 292 and the second lock 293 to depress into the platform 270. The depression of the first lock 292 and the second lock 293 into the platform 270 allows for the second portion 264 of the support mechanism 260 to be readily moved relative to the first portion 262. The autochanger 100 instructs the picker 162 to move in the negative horizontal direction 114 a predetermined distance, which causes the imaging device 250 to move to the first position. It should be note that in the event the imaging device 250 is located in the first position prior to the above-described process, the imaging device 250 will remain in the first position during the process.

Referring to FIGS. 1, 2, and 3, the autochanger 100 then orients itself with reference to the media pieces 170. This orientation is performed by moving the picker 162 in the negative vertical direction 120 until it encounters the negative vertical hard stop. The picker 162 is then moved in the positive horizontal direction 112 until it encounters the positive horizontal hard stop. The picker 162 is now in a known position relative to the media pieces 170 located in the library 160.

At this point, the autochanger 100 may commence inventorying the media pieces 170. The autochanger 100 moves the picker 162 predetermined distances to a position wherein the imaging device 250 is able to read the optical indicum 196 attached to the first media piece 180. More specifically, the autochanger 100 moves the picker 162 to a point where the axis AA intersects the left portion 197 of the indicum 196. The autochanger 100 then moves the picker 162 in the positive horizontal direction 112 so that the axis AA scans the indicum 196. This movement continues until the axis AA intersects the right portion 199 of the indicum 196. The imaging device 250 generates image data representative of the indicum 196 in a conventional manner. The image data may identify the first media piece 180. Accordingly, the autochanger 100 is able to catalog the identity and location of the first media piece 180.

The autochanger 100 then moves the picker 162 in the negative horizontal direction 114 and the positive vertical direction 118 to a point where the axis AA intersects the left portion 197 of the indicum 196 affixed to the media piece 170 located above the first media piece 180. The indicum 196 is read and the identity and location of the media piece are cataloged as described above with reference to the first media piece 180. This process of reading indicia 196 is repeated for all the media pieces 170 located in the third column 178. It should be noted that the operation of the reading the indicum 196 may proceed in either the positive horizontal direction 112 or the negative horizontal direction 114. The autochanger 100 then moves the picker 162 so that the imaging device 250 may read the indicia 196 affixed to the media pieces 170 located in the second column 176. It should be noted that the imaging device 250 may be located in either the first position or the second position, FIG. 9, to read the indicia 196 affixed to the media pieces 170 located in the second column 176.

In order for the imaging device 250 to read the indicia 196 affixed to the media pieces 170 located in the first column 174, the imaging device 250 has to move to the second position relative to the picker 162 as illustrated in FIG. 9. If the imaging device 250 did not move, the picker 162 would have to move in the horizontal direction 110 beyond the right portion 132 of the chassis 130. Thus, an autochanger 100 with a larger width W1 would be required. The autochanger 100 moves in the horizontal direction 110 and the vertical direction 116 to a point where the first prong 364, FIG. 8, and the second prong 366 of the engagement member 164 contact the second stop 342, FIG. 7, of the slide 330. The first prong 364, FIG. 8, and the second prong 366 may also serve to depress the first lock 292 and the second lock 293. The picker 162 then moves in the positive horizontal direction 112, which causes the second portion 264 to move relative to the support mechanism 260. This in turn causes the imaging device 250, FIG. 9, to move to the second position. The autochanger 100 then causes the picker 162 to move the imaging device 250 to positions where the imaging device 250 may read the indicia 196 affixed to the media pieces 170 located in the first column 174.

When the autochanger 100 has cataloged the identity and locations of the media pieces 170, the autochanger 100 may write data to and read data from the media pieces 170. Because the locations and identities of the media pieces 170 are known, the picker 162 may move selected media pieces 170 to the media player 166 where data may be read from and written to the media pieces 170.

Having described an embodiment of the autochanger 100, other embodiments of the autochanger 100 will now be described.

In one embodiment of the autochanger 100, sensors may be used to determine the location of the imaging device 250 relative to the picker 162. For example, a switch or the like may be operatively associated with the support mechanism 260. The switch may toggle to a first direction when the imaging device 250 is located in the first position and the switch may toggle to a second direction when the support mechanism 260 is located in the second position.

In another embodiment of the autochanger 100 an electromechanical device may be operative associated between the imaging device 250 and the picker 162. The electromechanical device may move the imaging device 250 between the first position and the second position in a conventional manner.

In another embodiment of the autochanger 100, FIG. 1, the imaging device 250, FIG. 3, is maintained in a fixed position relative to the picker 162. In this embodiment, a non-movable support mechanism 260 may secure the imaging device 250 to the picker 162. In this embodiment, the indicia 196, FIG. 2, are read as described above by providing relative movement between the imaging device 250 and the indicia 196.

It should be noted that the description herein is directed to an autochanger for illustration purposes only. In practice, the apparatus and method described herein can be used in any application where it is desired to scan information in a compact environment.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A media handling device comprising:
   a picker;
   a support mechanism having a first portion and a second portion wherein said first portion is attached to said picker and wherein said second portion is movably associated with said first portion;
   wherein said support mechanism first portion is slidably attached to said support mechanism second portion;
   an imaging device attached to said support mechanism second portion;
   said support mechanism first portion comprising:
      a bracket, a retainer, a lock member, and a detent mechanism;
      wherein said bracket is attached to said picker;
      wherein said retainer is attached to said bracket;
      wherein said lock member is movably associated with said bracket along a second axis and wherein said lock member has a locked state and an unlocked state;
      wherein said detent mechanism is operatively associated between said bracket and said lock member and is adapted to bias said lock member in said locked state;

said support mechanism second portion comprising:
  a support member, a channel, and guide;
  wherein said imaging device is attached to said support member;
  wherein said guide is slidably engaged with said retainer; and
  wherein said channel has an open portion and a closed portion, wherein said channel engages said lock member, wherein said lock member is in said locked state when said lock member engages said channel open portion and wherein said lock member is in said unlocked state when said lock member engages said channel closed portion; and
said support mechanism second portion having a first operative position and a second operative position relative to said support mechanism first portion.

2. The media handling device of claim 1 and further comprising a lock mechanism associated with said lock member wherein said lock mechanism is adapted to lock said support mechanism second portion in said first operative position or in said second operative position relative to said support mechanism first portion.

3. The media handling device of claim 1 wherein said lock member extends through said support mechanism first portion and engaging said support mechanism second portion.

4. The media handling device of claim 1 wherein said imaging device is a fixed beam bar code reader.

5. The media handling device of claim 1 wherein said picker is movable along a first axis and wherein said support mechanism second portion is movable relative to said support mechanism first portion along said first axis.

6. The media handling device of claim 1 and further comprising an electromechanical device operatively associated between said support mechanism first portion and said support mechanism second portion, wherein said electromechanical device is adapted to move said support mechanism second portion between said first operative position and said second operative position relative to said support mechanism first portion.

7. The media handling device of claim 1 wherein said picker has a fixed beam associated therewith.

8. An autochanger comprising:
  a media library having a plurality of media holding bays;
  a picker movably associated with said media holding bays, said picker comprising:
    a support mechanism having a first portion and a second portion wherein said first portion is attached to said picker and wherein said second portion is movably associated with said first portion;
    wherein said support mechanism first portion is slidably attached to said support mechanism second portion;
    said support mechanism second portion having a first operative position and a second operative position relative to said support mechanism first portion; and
    an imaging device attached to said support mechanism second portion;
  said support mechanism first portion comprising:
    a bracket, a retainer, a lock member, and a detent mechanism;
    wherein said bracket is attached to said picker;
    wherein said retainer is attached to said bracket;
    wherein said lock member is movably associated with said bracket along a second axis and wherein said lock member has a locked state and an unlocked state;
    wherein said detent mechanism is operatively associated between said bracket and said lock member and is adapted to bias said lock member in said locked state; and
  wherein said support mechanism second portion comprises:
    a support member, a channel, and guide;
    wherein said imaging device is attached to said support member;
    wherein said guide is slidably engaged with said retainer; and
    wherein said channel has an open portion and a closed portion, wherein said channel engages said lock member, wherein said lock member is in said locked state when said lock member engages said channel open portion and wherein said lock member is in said unlocked state when said lock member engages said channel closed portion.

9. The autochanger of claim 8 and further comprising a lock mechanism associated with said lock member wherein said lock mechanism locks said support mechanism second portion in said first operative position or in said second operative position relative to said support mechanism first portion.

10. The autochanger of claim 8 wherein said lock member extends through said support mechanism first portion and engaging said support mechanism second portion.

11. The autochanger of claim 8 wherein said imaging device is a fixed beam bar code reader.

12. The autochanger of claim 8 wherein said picker is movable along a first axis and wherein said support mechanism second portion is movable relative to said support mechanism first portion along said first axis.

13. The autochanger of claim 8 and further comprising an electromechanical device associated with said support mechanism, wherein said electromechanical device is adapted to move said support mechanism second portion between said first operative position and said second operative position relative to said support mechanism first portion.

14. The autochanger of claim 8 and further comprising a chassis, said chassis having an engagement member extending therefrom, said engagement member being positioned to contact said support mechanism second portion.

15. The autochanger of claim 8 and further comprising a first media holding bay, a second media holding bay, and a light path, wherein said light path extends between said first media holding bay and said imaging device when said support mechanism second portion is in said first operative position, and wherein said light path extends between said second media holding bay and said imaging device when said support mechanism second portion is in said second operative position.

* * * * *